Patented Nov. 24, 1925.

1,563,020

UNITED STATES PATENT OFFICE.

SCOTT J. DAVIS, OF OKLAHOMA CITY, OKLAHOMA, ASSIGNOR TO E. F. COMEGYS, OF OKLAHOMA CITY, OKLAHOMA.

PRESERVED FLAVORED MILK DRINK AND PROCESS OF PREPARING SAME.

No Drawing. Application filed August 7, 1923. Serial No. 656,300.

*To all whom it may concern:*

Be it known that I, SCOTT J. DAVIS, a citizen of the United States, residing at Oklahoma City, in the county of Oklahoma, State of Oklahoma, have invented certain new and useful Improvements in Preserved Flavored Milk Drinks and Processes of Preparing Same, of which the following is a description.

This invention relates to a flavored ready-to-drink beverage made from cow's or goat's raw milk, and more particularly to such a product which may be kept indefinitely without adding any preservative thereto or without changing the food values, chemical properties or natural taste of the milk. The invention also resides in the process by which the product is made.

It is well known that milk is one of the most nourishing foods and is, therefore, peculiarly adaptable for beverages. And it is as equally as well known that chocolate is probably the most suitable of all the flavoring agents, for beverage purposes since it possesses distinctly high food values. It is particularly salubrious for children and invalids because it is easy to digest and assimilate. The combination of milk, chocolate and sugar is, therefore, a most excellent beverage from most all standpoints.

However, up to the present no one has been able to produce a practical, flavored milk drink, and particularly a ready-to-drink chocolate milk beverage which may be preserved indefinitely and retain substantially all the food values of the ingredients, which is of uniform texture, quality and appearance, retains its characteristic taste, and is as successfully marketable as a chocolate milk drink freshly prepared. Prior attempts have resulted in a curdy, lumpy product, generally burnt, of a peculiar taste and appearance foreign to the freshly prepared chocolate milk drink.

One of the objects of the present invention resides in producing a ready-to-drink, particularly milk chocolate beverage, in which the butter fat globules have been effectively broken down and emulsified with the other elements of the various ingredients, so that the entire liquid substance is reduced to a permanent homogenous consistency which may be kept in sealed containers indefinitely without deterioration in food value, flavor or appearance, and which particularly is absolutely sterile of all pathogenic organisms.

Still another object of the present invention resides in the substantial liquefying of the fats and other ingredients of the various components preliminary to homogenization, so that an effective emulsification will be produced by the homogenizer and the mixture is stabilized to prevent stratification of the ingredients.

A further feature of the invention resides in the sterilization of the substance subsequent to homogenization in such a proper manner as to preserve the beverage and at the same time retain the natural appearance, taste and feed properties of the product.

Yet another feature of the invention resides in the process wherein the beverage is given a definite heat treatment, to prepare the ingredients for homogenization, is then homogenized at a prescribed pressure and temperature to attain complete and permanent mixture of the ingredients, such as the butter fats, cocoa fats and other fats, followed by a prescribed sterilizing treatment to thereby most efficiently and permanently preserve the beverage.

These and other objects of the invention will appear manifest from a perusal of the following specification.

The invention contemplates the production of a ready-to-drink milk beverage flavored with chocolate or cocoa, or with various flavors and fruit juices. Particular attention is called to the special adaptability of the present process to the production of a most superior milk chocolate drink, and in view of this the invention will be exemplified in connection with the production of a milk chocolate drink.

According to my process, the chocolate, cane sugar and milk must be of superior quality. The milk must not contain substantially more than .20 of one per cent. of acid. The cane sugar must be as pure as possible and substantially free from foreign matter. The chocolate must be a good commercial product free from foreign matter.

The milk is run into a container and to it are added substantially 8% of chocolate and 7% of cane sugar. This mixture is then heated to substantially 160° F. and at the same time severely agitated to thoroughly liquefy and mix the various ingredients. After reaching the temperature of substantially 160° F., the mixture is held for substantially fifteen minutes which will thoroughly liquefy the fats and at the same time arrest the germ life therein.

This heat treatment preliminary to homogenization is most essential. It has been discovered that it is absolutely necessary that the mixture be heated to approximately definite temperature prior to homogenization so that the fats in both milk and chocolate will be in liquid form before they pass through the homogenizer for thorough emulsification. This is because the fats of the milk and chocolate will not mix if they are cold and will not mix in any way whatsoever until a certain temperature has been reached. For instance if they are passed through the homogenizer cold or even lukewarm, the fats instead of being broken down, squeezed or homogenized will simply churn, as in making butter, and will cause lumps, clots and large particles in the products.

The mixture is then passed through a homogenizer, such for instance, as is disclosed in the patent to D. F. Hormann, No. 1,451,393, issued April 10, 1923, at the above stated temperature and at a pressure of substantially 2000 pounds per square inch. By using a temperature of substantially 160° F., and a pressure of substantially 2000 pounds per square inch, I get a complete and efficient breaking down of the butter fat globules in the milk and the cocoa fat in the chocolate, so that the mixture will never separate out but will remain a homogeneous mass indefinitely and the product is rendered at least fifty percent. more digestable and assimilable, particularly for infants and invalids.

The next step in my process is to immediately cool the product to 50° F. as it comes from the homogenizer after which it is placed in containers and hermetically sealed.

The air-tight containers are now placed in a sterilizer when the product is sterilized by steam pressure. The sterilizer is preferably constructed and arranged so that the containers of the product are agitated as they are subjected to the steam; thereby heating each individual container uniformly and efficiently. When the sterilizer is filled with as many containers as desired, the temperature within the sterilizer is raised as rapidly as possible to a temperature of substantially 230° F. and held there for substantially 12 minutes, after which the temperature is reduced as rapidly as possible to at least 50° F. which completes the process and the beverage is ready for market and is guaranteed to be a sterile, uniform, practical and marketable product which will have no separation of its elements and will keep indefinitely until the seals of the containers are opened.

The proper sterilization of the product is most important, for, due to the very large and relatively excessive amount of sugar the product contains, sterilizing would be a very critical performance. Sugar, when heated to a certain temperature will caramelize. Any temperature above the boiling point of water, if carried for too long a time, will cause sugar to caramelize and when sugar caramelizes, it changes its form chemically and splits up into other compounds, which have entirely different colors, flavors and odors. If sterilizing is not properly carried out the product will have an objectionable flavor and appearance, which will make it unmarketable and unfit for use.

The milk drink herein set forth contains all the natural elements of nourishment of ordinary cow's or goat's milk, together with all the nourishing ingredients present in the flavoring component and other components of the drink. Furthermore, by the process of preservation hereinbefore set forh, these natural food values are retained without deterioration, while at the same time the substance is rendered sterile and free from any tendency to develop bacteria of bacilli. The beverage produced is thoroughly cleansed of all objectionable odors and gases and by the specific homogenization and preliminary heat treatment is rendered permanently homogeneous, so that the globules of butter fat are completely mixed with the casein, albumen, inorganic salts, with the sugar, cocoa fats and butter fats of the other components. Furthermore, by shredding or comminuting the fat globules to approximately one micron in diameter the creaming power of the milk is practically eliminated.

Having thus described my invention, what I claim as new and desire to secure by Letters Patent, is:

1. The process of producing a ready-to-drink milk chocolate beverage which consists in heating a mixture of chocolate, a sweetening ingredient, and milk to a sufficient temperature to liquefy the fats, but for a period of time and under conditions insufficient to evaporate any substantial percentage of water, homogenizing the mixture at a sufficient temperature and pressure to permanently and effectively emulsify the ingredients, and finally sealing and sterilizing.

2. The process of producing a chocolate flavored milk drink consisting in thoroughly heating chocolate, cow's or goat's milk, and sugar, to substantially 160° F. for approximately fifteen minutes, homogenizing the mixture at a temperature of substantially 160° F. and at a pressure of substantially 2000 pounds per square inch, and thereafter sterilizing the milk.

3. The process of producing a chocolate flavored cow's milk consisting in thoroughly heating the milk, chocolate and sugar to substantially 160° F., homogenizing the same at a temperature of substantially 160° F., and pressure of substantially 2000 pounds per square inch, cooling the same to 50° F., and thereafter sterilizing the same by speedily raising its temperature to substantially 230° F. for substantially 12 minutes, and finally rapidly reducing the temperature to 50° F.

4. The process of producing a chocolate flavored cow's milk consisting in thoroughly heating the milk, chocolate and sugar to substantially 160° F., homogenizing the same at a temperature of substantially 160° F., and pressure of substantially 2000 pounds per square inch, cooling the same to approximately 50° F., and thereafter sterilizing the same by speedily raising its temperature to substantially 230° F., for approximately 12 minutes, and finally rapidly reducing the temperature to approximately 50° F.

5. The process of producing a chocolate flavored milk drink consisting in combining with clarified cow's or goat's milk having an acid content not exceeding .20 of one per cent, about 8% chocolate and about 7% sugar, heating the mixture to approximately 160° F. for about 12 minutes while agitating, passing the mixture through a homogenizer at a temperature of about 160° F., and at a pressure of about 2000 pounds per square inch, cooling it to a temperature of approximately 50° F. to 60° F., sealing in containers, sterilizing at a temperature of approximately 230° F. for about 12 minutes, said temperature being reached as soon as possible after heating is started, and finally cooling the substance immediately to approximately 50° F. to 60° F.

6. A sterile chocolate flavored milk beverage comprising a mixture of chocolate, sugar and milk, which mixture was preliminarily heated prior to homogenization and sterilization to a sufficient temperature to liquefy the fats, but for a period of time and under conditions insufficient to evaporate any substantial percentage of water, such beverage being substantially stable and having substantially the same fluidity as milk.

In testimony whereof, I affix my signature.

SCOTT J. DAVIS.